US009033192B2

(12) United States Patent
Hapke

(10) Patent No.: US 9,033,192 B2
(45) Date of Patent: May 19, 2015

(54) ROTARY ACTUATOR FOR ENERGY EFFICIENT ICE CUBE DISPENSER DOOR SYSTEM

(75) Inventor: Kenyon A. Hapke, Glenview, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 20 days.

(21) Appl. No.: 14/232,762

(22) PCT Filed: Jul. 13, 2012

(86) PCT No.: PCT/US2012/046689
§ 371 (c)(1),
(2), (4) Date: Jan. 14, 2014

(87) PCT Pub. No.: WO2013/012730
PCT Pub. Date: Jan. 24, 2013

(65) Prior Publication Data
US 2014/0124688 A1 May 8, 2014

Related U.S. Application Data

(60) Provisional application No. 61/508,345, filed on Jul. 15, 2011.

(51) Int. Cl.
*H02K 7/116* (2006.01)
*H02K 26/00* (2006.01)
*H02K 7/10* (2006.01)
*H02K 7/106* (2006.01)
*H02K 11/00* (2006.01)
(Continued)

(52) U.S. Cl.
CPC ............... *H02K 7/116* (2013.01); *H02K 26/00*
(2013.01); *H02K 7/10* (2013.01); *H02K 7/106*
(2013.01); *H02K 11/0068* (2013.01); *F25C 5/005* (2013.01); *F16K 1/16* (2013.01)

(58) Field of Classification Search
CPC ... H02K 7/116; H02K 11/0068; H02K 26/00; H02K 7/10; H02K 7/106; F16K 1/16; F25C 5/005
USPC ............... 251/129.11–129.13, 286–288, 248, 251/250.5; 222/504, 508; 62/266
See application file for complete search history.

(56) References Cited

U.S. PATENT DOCUMENTS 3,942,334 A * 3/1976 Pink ................................. 62/344
4,921,149 A * 5/1990 Miller et al. .................. 222/504
(Continued)

FOREIGN PATENT DOCUMENTS

CN 101871710 A 10/2010
CN 201697404 U 1/2011
(Continued)

OTHER PUBLICATIONS

ISR and WO for PCT/US2012/046689 dated Oct. 10, 2013.

*Primary Examiner* — John Bastianelli

(57) ABSTRACT

A rotary actuator suitable for use in a refrigerator ice-dispensing door provides a rotating shaft driven by a DC permanent magnet motor through a gear train and subject to a returning force of an internal spring. The gear train communicates with a switch to reduce current to the motor when a limit of travel is reached and a shunting path is provided around the motor to produce generative braking when power is removed from the motor and the actuator rotates backward to its initial position.

18 Claims, 4 Drawing Sheets

(51) Int. Cl.
*F25C 5/00* (2006.01)
*F16K 1/16* (2006.01)

(56) References Cited

U.S. PATENT DOCUMENTS

| | | | |
|---|---|---|---|
| 6,320,285 B1 * | 11/2001 | Ito et al. | 251/129.12 |
| 7,316,121 B2 * | 1/2008 | Lee et al. | 62/344 |
| 7,543,794 B2 * | 6/2009 | Kouzu et al. | 251/250.5 |
| 7,703,297 B2 * | 4/2010 | Bowen et al. | 251/129.12 |
| 2006/0144075 A1 | 7/2006 | Bowen et al. | |
| 2008/0156027 A1 * | 7/2008 | Jeong et al. | 62/389 |
| 2009/0108220 A1 * | 4/2009 | Staev | 251/129.12 |
| 2009/0249817 A1 * | 10/2009 | Park et al. | 62/340 |
| 2010/0082159 A1 * | 4/2010 | Kim et al. | 222/23 |
| 2010/0089492 A1 * | 4/2010 | Dirnberger et al. | 222/504 |
| 2010/0132835 A1 | 6/2010 | Oh | |
| 2011/0175006 A1 * | 7/2011 | Dolenti et al. | 251/129.11 |

FOREIGN PATENT DOCUMENTS

| | | |
|---|---|---|
| CN | 201865480 U | 6/2011 |
| EP | 1291315 A2 | 3/2003 |
| KR | 20090112362 A | 10/2009 |

* cited by examiner

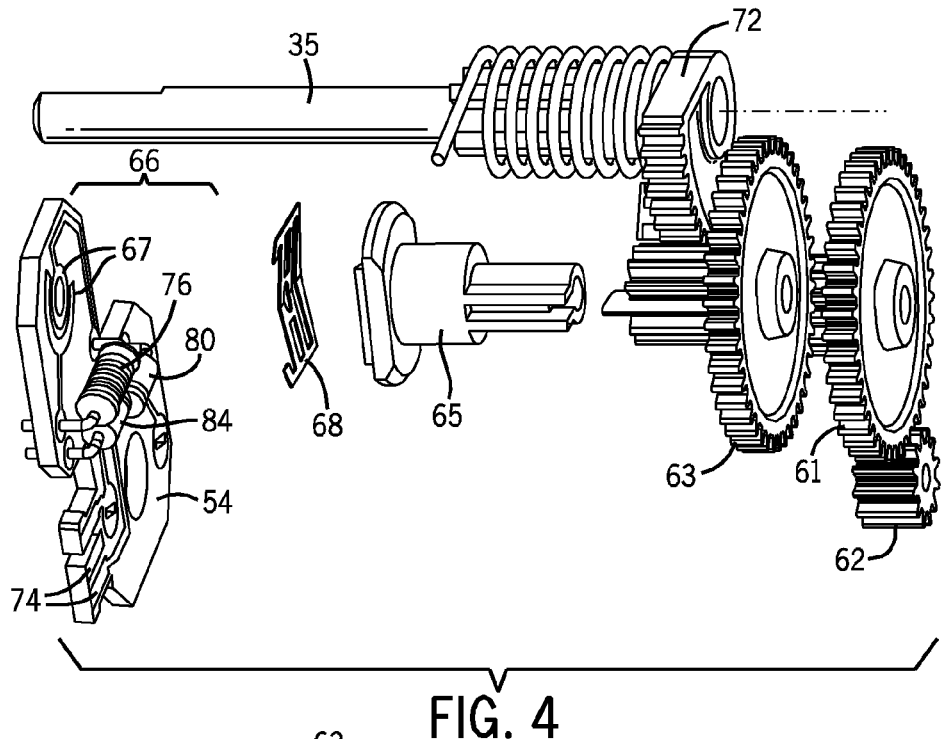
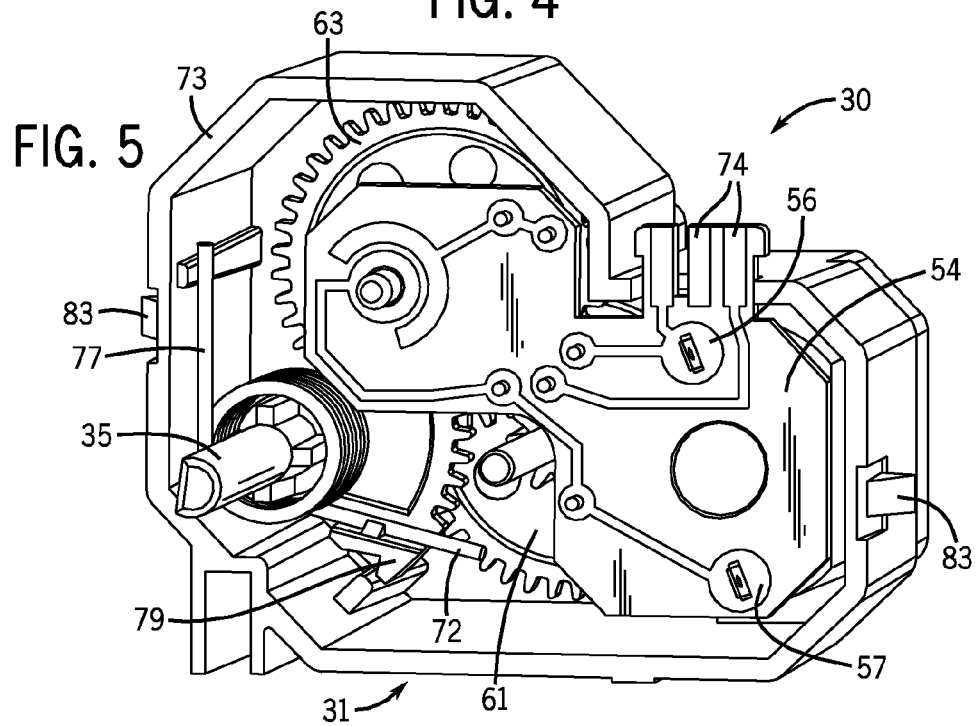

ROTARY ACTUATOR FOR ENERGY EFFICIENT ICE CUBE DISPENSER DOOR SYSTEM

CROSS-REFERENCE TO RELATED APPLICATIONS

This application is National Phase of PCT/US2012/046689 filed Jul. 13, 2012 and claims the benefit of U.S. provisional application 61/508,345 filed Jul. 15, 2011 and hereby incorporated by reference.

FIELD OF THE INVENTION

The present invention relates to a compact rotary actuator and in particular to an electrically actuated door through which ice cubes may be dispensed, using such an actuator.

BACKGROUND OF THE INVENTION

Consumer refrigerators may have ice dispensers that dispense ice through an opening in a freezer compartment door. Typically, the opening in the freezer door includes a dispenser door that automatically opens and closes to restrict the entry of ambient air into the freezer compartment.

The dispenser door is normally held closed by a bias spring. When ice is requested by the user, the dispenser door is opened, typically by a solenoid triggered by a switch. The switch may be positioned near the dispenser door to be activated, for example, by the lip of a drinking glass positioned near the dispenser door.

In the time period during which the dispenser door is held open for the discharge of ice, power must be applied to the solenoid. Solenoids consume significant power during operation and are prone to buzzing when supplied with unregulated power. The rapid action of the solenoid can produce a loud popping sound when the doors open and close.

SUMMARY OF THE INVENTION

The present invention provides an actuator for an ice dispenser door that employs a low-power DC motor. A gear train connecting to the DC motor and the self regulating properties of DC motors moderate the speed of opening of the dispenser door when power is applied to the motor. Further, generative electrical braking through the motor slows the closing speed of the dispenser door. In this way, door impact sounds are substantially reduced. A switch system lowers the power to the motor when the dispenser door is opened to limit the holding state power consumption to much less than required by a solenoid.

In one embodiment, the present invention provides an ice dispenser door system having a door plate attached to a door frame defining a door opening to pivot about an axis on a door shaft to one side of the door opening. A DC permanent magnet motor providing a rotating motor shaft and reducing gear train provides a first gear attached to the motor shaft to rotate therewith and a last gear attached to the door shaft to rotate the door shaft with rotation of the motor. A stop limits rotation of the door shaft in a first direction as driven by the motor through the gear train when power is applied to the motor; and a spring biases rotation of the door shaft in a second direction opposite the first direction, the spring sized to rotate the door shaft in the second direction when power is not applied to the motor.

It is thus a feature of at least one embodiment of the invention to provide an energy efficient ice door employing a DC motor over a higher power consumption solenoid. It is another feature of at least one embodiment of the invention to provide a replacement ice door that may use the same signals as would be provided to a solenoid.

The ice dispenser door system may further include an electrical switch actuating when the rotary shaft is rotating in the first direction before being limited by the stop to add a resistance in series with the motor.

It is thus a feature of at least one embodiment of the invention to provide a positive holding of the door in an open state with reduced power consumption below a power level necessary to open the door.

The electrical switch may be actuated by an intermediary gear in the gear train before the last gear.

It is thus a feature of at least one embodiment of the invention to provide high accuracy power control for the motor. By increasing a relative movement of the switch operator with respect to the door through the gear train, high accuracy switching may be obtained in a compact switch.

The electrical switch may be a rotary electrical switch attached to a shaft communicating with the intermediary gear.

It is thus a feature of at least one embodiment of the invention to provide a simple switch element well adapted for activation by rotating shafts.

The gear train and motor may retain engagement with the door shaft with movement of the door shaft in the first and second directions and the ice door delivery system may further include a shunting element allowing current flow through the shunting element as generated by the motor with movement of the door shaft in the second direction whereby a damping of that movement may be obtained by electrical resistive dissipation.

It is thus a feature of at least one embodiment of the invention to slow the closure of the door by dissipating spring energy in electrical power generated by the motor.

The shunting element may be a diode back-biased when the power is applied to the motor.

It is thus a feature of at least one embodiment of the invention to provide shunting only during door closure without diverting power during door opening, making use of the selective conduction direction of the diode.

The ice dispenser door system may further including a second stop limiting rotation of the door shaft in a second direction.

It is thus a feature of at least one embodiment of the invention to provide a self-contained actuator element that may be shared among other applications.

The spring may be a helical torsion spring fitting coaxially around the door shaft.

It is thus a feature of at least one embodiment of the invention to provide a self-contained spring limiting the need for external returning mechanisms, for example an external spring or a weighting of the door.

The ice dispenser door system may further include a housing containing the motor, gear train, spring, stop and first portion of the door shaft and having an opening providing a journal through which the door shaft may extend to expose a second portion of the door shaft outside of the housing.

It is thus a feature of at least one embodiment of the invention to provide a self-contained actuator that may be tested in isolation.

Other features and advantages of the invention will become apparent to those skilled in the art upon review of the following detailed description, claims and drawings in which like numerals are used to designate like features.

BRIEF DESCRIPTION OF THE DRAWINGS

FIG. 4 is an exploded perspective view of the mechanism of FIG. 3;

FIG. 5 is a cutaway view of the housing of the rotary actuator of FIG. 2 showing the internal mechanism of FIG. 3 as fitting therein.

Figure 1:
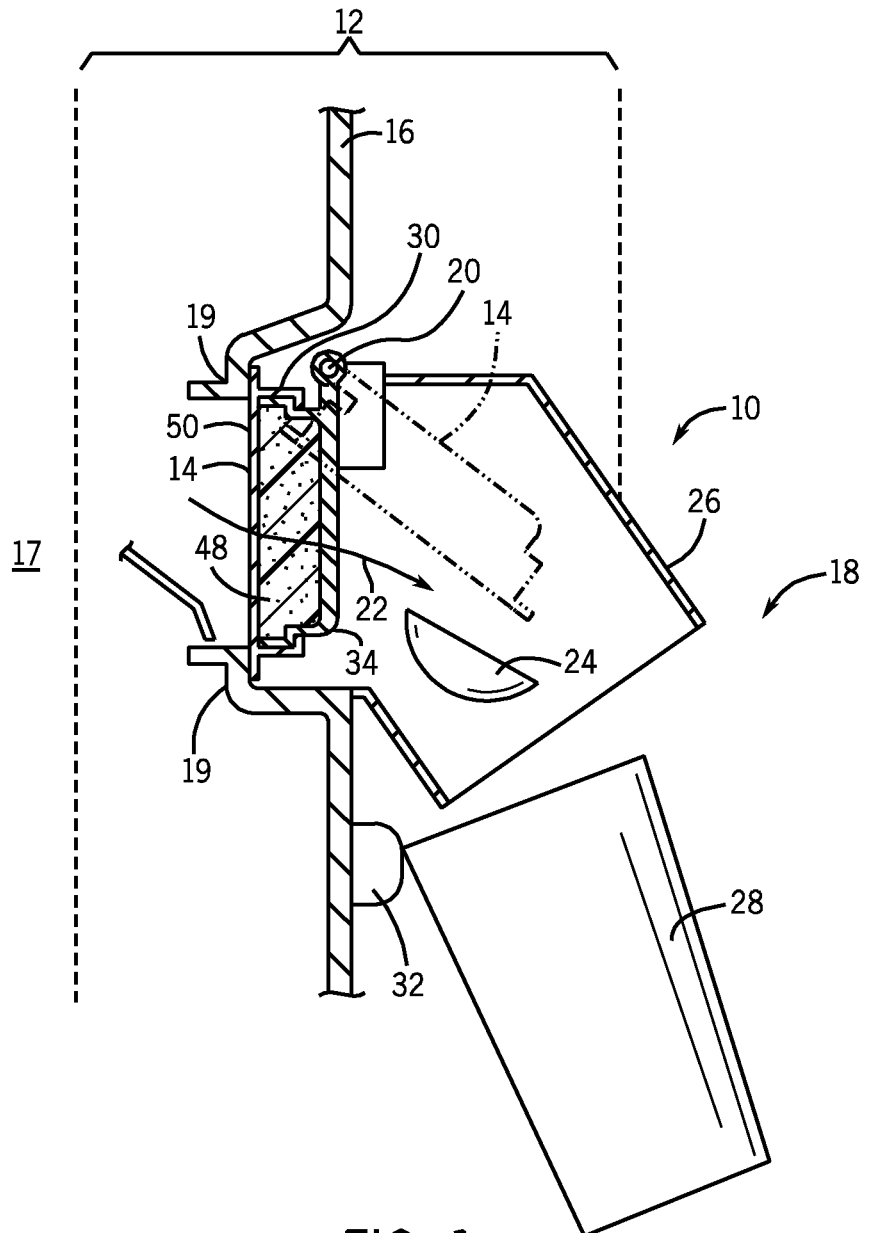
FIG. 1 is a simplified side elevational view of an ice cube dispenser door, for example, in the door of a refrigerator for dispensing ice cubes into an adjacent glass.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, an ice cube dispensing mechanism 10 per the present invention may fit inside a refrigerator door 12 or the like to provide a pivoting dispenser door 14 on a divider wall 16, the divider wall 16 separating a refrigerated volume 17 of a refrigerator from outside air 18.

The dispenser door 14 may pivot about an axis 20 to cover or uncover an opening 19 through the divider wall 16 and, in the open position, to provide an unobstructed path 22 for ice cubes 24 to pass down a chute 26 into a glass 28 or the like. Activation of the door 14 to pivot about axis 20 may be provided by a rotary actuator 30 controlled, for example, by electrical dispenser switch 32 operated by a lip of the glass 28.

Figure 2:
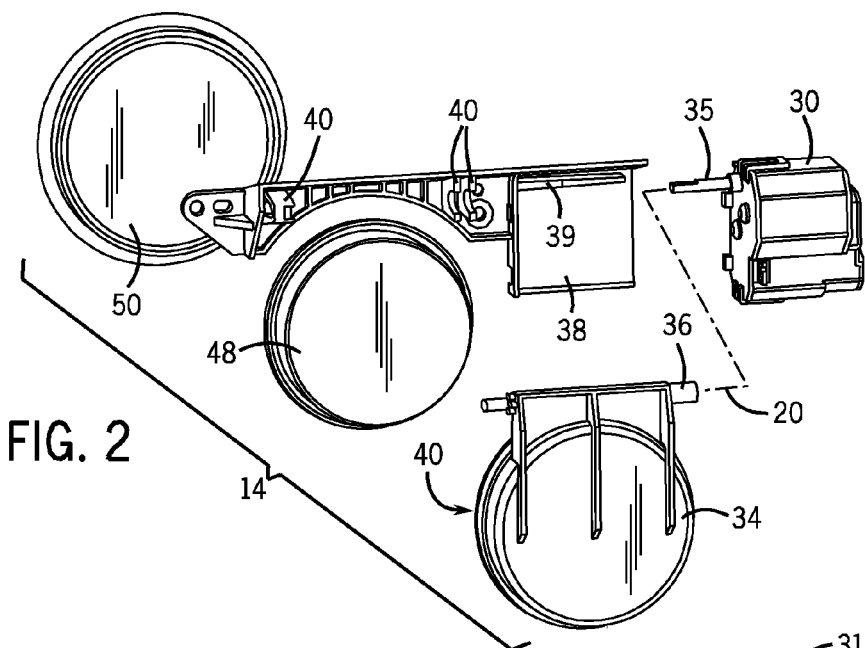
FIG. 2 is an exploded perspective view of the dispenser door of FIG. 1 showing its constituent rigid shell member, insulating member and an elastomeric gasket communicating via a shaft with a rotary actuator of the present invention.

Referring now to FIGS. 1 and 2, the door 14 may include a rigid flapper 34 pivoting about an axle 36 extending along the axis 20 and engaging in one direction with an output shaft 35 of the rotary actuator 30. The axle 36 may be retained in journals 40 in a frame 38, the latter of which may attach against the inside of the divider wall 16 above the opening 19. The rigid flapper 34 may provide a cylindrical cup-shaped cavity 46 facing inward toward the refrigerated volume 17 receiving an insulating foam element 48 (expanded polystyrene). The foam element 48 may be captured within the cylindrical cup-shaped cavity 46 by an elastomeric gasket 50 fitting over a lip of the cylindrical cup-shaped cavity 46.

Figure 3:
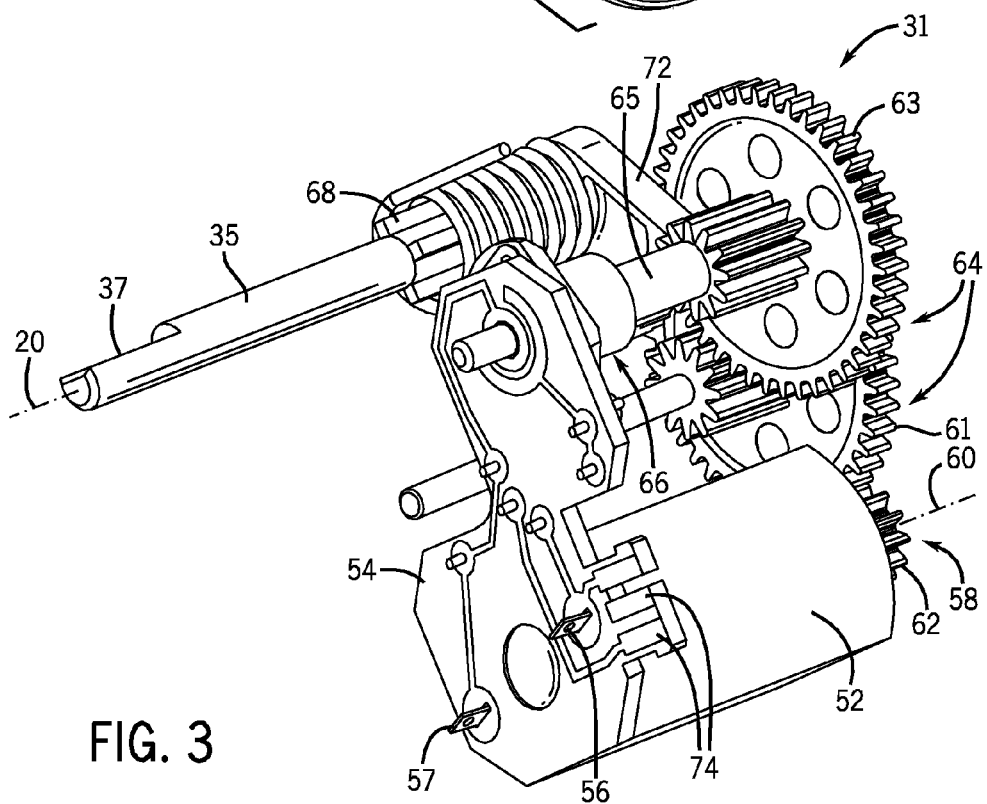
FIG. 3 is a perspective view of an internal mechanism of the rotary actuator showing an electrical switch for controlling power to the internal DC motor as a function of door angle.

Referring now to FIGS. 2 and 3, the axle 36 extending toward the rotary actuator 30 may include a bore fitting over the output shaft 35 of the rotary actuator 30 and having an internal shelf to engage a flat 37 in the output shaft 35 allowing the two to rotate together along axis 20 when the rotary actuator 30 is slid axially into engagement with retention elements 39 on the frame 38.

Referring now to FIGS. 3 and 4, the internal mechanism 31 of the rotary actuator 30 includes a sub-fractional horsepower DC electric motor 52 (having an operating power of less than 25 watts and preferably less than 10 watts). The DC electric motor 52 includes a permanent magnet stator and brushes, the latter of which may attach to a printed circuit board 54 by means of conductive motor terminals 56 and 57 extending from a base of the motor 52. The motor shaft 58 extending opposite from the base along an axis 60 parallel to axis 20 may hold a spur gear 62 engaging with a reducing gear train 64.

The reducing gear train 64 includes: gear set 61, 63 and partial gear 72. Gear set 61 has a larger diameter gear communicating with the spur gear 62 and a co-rotating smaller diameter gear communicating with a larger diameter gear of gear set 63. A smaller diameter gear of gear set 63, co-rotating with the larger diameter gear of gear set 63, communicates with a partial gear 72 which is attached directly to the output shaft 35.

A shaft 65 rotating with gear set 63 also attaches to a rotary switch 66 formed by an inner engagement of a conductive wiper 68 held on the shaft 65 and conductive traces 67 on the printed circuit board 54 as will be described in more detail below.

The gear set 63 communicating with a partial gear 72 drives the output shaft 35 such that the angular range of the shaft 35 in opening and closing the door 14 corresponds to the door movement range of about 55 degrees. Generally, the corresponding rotation of the shaft 65 attached to the gear set 63 before the partial gear 72, with full rotation of the shaft 35, will be much larger than the rotation of the shaft 35 as a result of the gearing between these two shafts 65 and 35 (a gear ratio of approximately 3.5:1). As a result, the rotation of the rotary switch 66 will be more than 180 degrees with opening or closing of the door 14. By attaching the rotary switch 66 to the shaft 65, instead of to the shaft 35 to rotate directly with rotation of the rigid flapper 34, much better precision may be obtained in the switch point of the rotary switch 66 as will be described below.

The printed circuit board 54 may also provide finger terminals 74 that may connect to a wiring harness in the refrigerator (not shown). It will be appreciated, therefore, that the printed circuit board 54 may provide for all electrical interconnections necessary for the rotary actuator 30 between the components of the motor 52, the diodes 80 and 84, the resistor 76, the rotary switch 66 (as well as providing for one contact of the rotary switch 66) and the finger terminals 74 eliminating any hand wiring.

Referring now to FIG. 5, the internal mechanism 31 of the rotary actuator 30 may fit within a housing 73 so that the finger terminals 74 and the output shaft 35 may extend therefrom. A torsion spring 77 fits coaxially about the output shaft 35 within the housing 73 between a wall of the housing 73 and a catch portion 79 on the partial gear 72 to bias the output shaft 35 in rotation so as to generally close the door 14 absent power to the motor 52. The self-contained torsion spring 77 allows full functional testing of the rotary actuator 30 independent of its attachment to other elements of the door mechanism.

The housing 73 may include catches 83 allowing it to snap together with a corresponding housing component (not shown) to fully enclose the internal mechanism 31 except for the output shaft 35 and the finger terminals 74 as noted.

Figure 6:
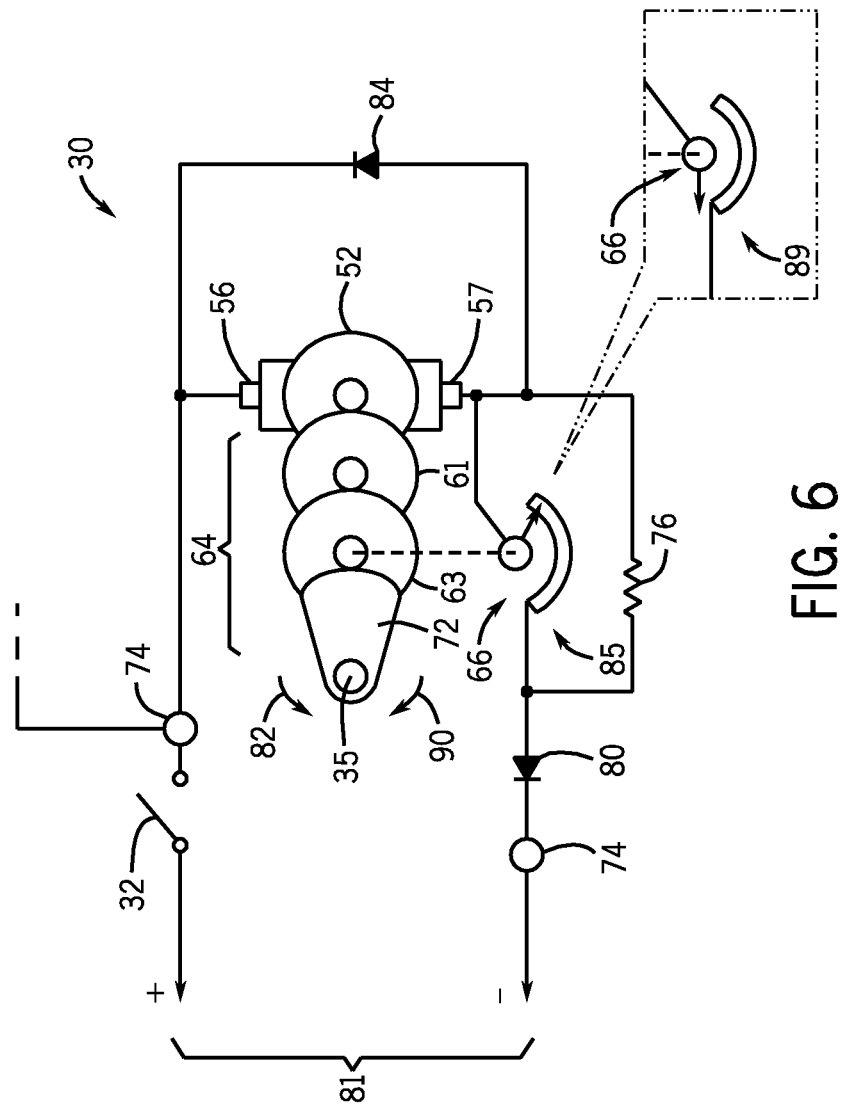
FIG. 6 is a schematic representation of the circuitry of the rotary actuator.

Referring now to FIGS. 4, 5 and 6, the rotary switch 66 may be positioned in series with the motor 52 between two terminals of the fingers 74. A source of DC electrical power 81 may be applied across terminals 74 through dispenser switch 32 so that a positive voltage (typically 13.2 volts DC and preferably less than 20 volts) is received directly by one terminal 56 of the motor 52 when a glass 28 is activating (closing) the dispenser switch 32.

The return for the DC electrical power 81 is received by the cathode of a diode 80 which serves to prevent damage to the rotary actuator 30 in the event of an improper reverse polarity connection of the rotary actuator 30 to power.

The anode of diode 80 connects to rotary switch 66 which in turn connects to the remaining terminal 57 of the motor 52. The terminals 56 and 57 of motor 52 are shunted by diode 80 whose cathode attaches to the terminal 56 directly receiving positive voltage. Likewise the rotary switch 66 is shunted by resistor 76.

Initially, when the dispensing door 14 is closed and the dispenser switch 32 is open (not activated by a glass 28), no power is applied to the motor 52 and the rotary actuator 30 remains stationary. At this time, rotary switch 66 is in a closed state 85 shorting resistor 76.

When dispenser switch 32 is closed, for example by pressing against it with a glass 28, power is applied to motor 52 through rotary switch 66 and forward biased diode 80 causing the motor 52 to rotate to open the door as indicated by arrow 82. Substantially zero current passes through diode 84 because it is back-biased and because rotary switch 66 is in a closed state 85 shorting resistor 76 so that substantially no current passes through resistor 76. As is understood in the art, the DC motor 52 is speed limited by back electromagnetic force (EMF) being proportional to the applied voltage and its limited speed is moderated by the gear train 64 to control the opening speed of the door 14 to reduce door opening impact sounds. In one embodiment the motor draws 500 milliamps at 13 volts providing substantially 6.5 watts to the motor 52.

Just before the door 14 is fully opened, rotary switch 66 moves to an open state 89 and power to the motor 52 must pass through resistor 76. Resistor 76 reduces the current through motor 52 to an amount necessary to hold the door open against the torsion spring 77 but substantially less than a power used to drive the rotary actuator 30 to open the door 14. Importantly, resistor 76 prevents over current to the motor 52 in the stall condition when the impedance of DC motors drops radically. In one embodiment, resistor 76 limits the current to the motor 52 to an amount providing substantially less than 6.5 watts to the motor 52. The resistor 76 reduces power consumption of the rotary actuator 30 (the total of power consumed by the motor 52 and the resistor 76) and concomitant heating of the actuator 30.

When dispenser switch 32 is opened, (for example by removal of the glass 28) the force of the torsion spring 77 causes the shaft 35 to rotate backward as indicated by arrow 90 in the opposite direction of arrow 82 also causing motor 52 to rotate backward. This rotation causes the motor 52 to generate electrical power forward biasing diode 84 to pass current therethrough. The resulting electrical power is dissipated in the diode 84 and the windings of the motor 52 and thereby serves to provide a generative braking of motion on the motor 52 slowing closure of the door 14 and reducing door closure impact sounds.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. An electrical rotary actuator comprising:
   an output shaft;
   a DC permanent magnet motor providing a rotating motor shaft;
   a reducing gear train including a first gear attached to the motor shaft to rotate therewith and a last gear attached to the output shaft to rotate the output shaft with rotation of the motor;
   a stop limiting rotation of the output shaft in a first direction as driven by the motor through the gear train when power is applied to the motor;
   a spring biasing rotation of the output shaft in a second direction opposite the first direction, the spring sized to rotate the output shaft in the second direction when power is not applied to the motor; and
   wherein the gear train and motor retain engagement with the output shaft with movement of the output shaft in the first and second directions and further including a shunting element allowing current flow through the shunting element as generated by the motor with movement of the output shaft in the second direction whereby a damping of that movement may be obtained by electrical resistive dissipation.

2. The electrical rotary actuator of claim 1 further including a housing containing the motor, gear train, spring, stop and first portion of the output shaft and having an opening providing a journal through which the output shaft may extend to expose a second portion of the output shaft outside of the housing.

3. The electrical rotary actuator of claim 2 wherein the motor is a brush motor having an operating power of less than 10 watts and an operating voltage of less than 20 volts.

4. The electrical rotary actuator of claim 1 wherein the shunting element is a diode back-biased when the power is applied to the motor.

5. The electrical rotary actuator of claim 4 further including an electrical switch actuating when the rotary shaft is rotating in the first direction before being limited by the stop to add a resistance in series with the motor.

6. The electrical rotary actuator of claim 5 wherein the electrical switch is actuated by an intermediary gear in the gear train before the last gear.

7. The electrical rotary actuator of claim 6 wherein the electrical switch is a rotary electrical switch attached to a shaft communicating with the intermediary gear.

8. The electrical rotary actuator of claim 7 further including a second stop limiting rotation of the output shaft in a second direction.

9. The electrical rotary actuator of claim 8 further including a printed circuit board interconnecting the elements of the DC permanent magnet motor, the shunting element, the electrical switch and electrical terminals communicating between the electrical rotary actuator and external control electronics.

10. The electrical rotary actuator of claim 9 further including a door plate attached to the output shaft to pivot with movement of the output shaft, the door plate communicating with a door opening to open the door and the output shaft abutting the first stop.

11. An ice dispenser door system comprising:
a door plate attached to a door frame defining a door opening to pivot about an axis on a door shaft to one side of the door opening;
a DC permanent magnet motor providing a rotating motor shaft;
a reducing gear train including a first gear attached to the motor shaft to rotate therewith and a last gear attached to the door shaft to rotate the door shaft with rotation of the motor;
a stop limiting rotation of the door shaft in a first direction as driven by the motor through the gear train when power is applied to the motor;
a spring biasing rotation of the door shaft in a second direction opposite the first direction, the spring sized to rotate the door shaft in the second direction when power is not applied to the motor; and
wherein the gear train and motor retain engagement with the output shaft with movement of the output shaft in the first and second directions and further including a shunting element allowing current flow through the shunting element as generated by the motor with movement of the output shaft in the second direction whereby a damping of that movement may be obtained by electrical resistive dissipation.

12. The ice dispenser door system of claim 11 further including an electrical switch actuating when the door shaft is rotating in the first direction before being limited by the stop to add a resistance in series with the motor.

13. The ice dispenser door system of claim 12 wherein the electrical switch is actuated by an intermediary gear in the gear train before the last gear.

14. The ice dispenser door system of claim 13 wherein the electrical switch is a rotary electrical switch attached to a shaft communicating with the intermediary gear.

15. The ice dispenser door system of claim 11 wherein the shunting element is a diode back-biased when the power is applied to the motor.

16. The ice dispenser door system of claim 15 further including a second stop limiting rotation of the door shaft in a second direction.

17. The ice dispenser door system of claim 16 wherein the spring is a helical torsion spring fitting coaxially around the door shaft.

18. The ice dispenser door system of claim 17 further including a housing containing the motor, gear train, spring, stop and first portion of the door shaft and having an opening providing a journal through which the door shaft may extend to expose a second portion of the door shaft outside of the housing.

* * * * *